United States Patent
Liu

(10) Patent No.: US 11,028,457 B2
(45) Date of Patent: Jun. 8, 2021

(54) METHOD OF HEAT TREATING A FASTENING MEMBER

(71) Applicant: Caterpillar Inc., Peoria, IL (US)

(72) Inventor: Tianjun Liu, Edwards, IL (US)

(73) Assignee: Caterpillar Inc., Peoria, IL (US)

(*) Notice: Subject to any disclaimer, the term of this patent is extended or adjusted under 35 U.S.C. 154(b) by 907 days.

(21) Appl. No.: 15/651,089

(22) Filed: Jul. 17, 2017

(65) Prior Publication Data

US 2019/0017141 A1     Jan. 17, 2019

(51) Int. Cl.
| | |
|---|---|
| C21D 9/00 | (2006.01) |
| C21D 1/18 | (2006.01) |
| C21D 1/58 | (2006.01) |
| C21D 1/60 | (2006.01) |
| C21D 1/78 | (2006.01) |
| C21D 1/10 | (2006.01) |
| C21D 1/25 | (2006.01) |
| C21D 1/42 | (2006.01) |

(52) U.S. Cl.
CPC ............. *C21D 9/0093* (2013.01); *C21D 1/10* (2013.01); *C21D 1/18* (2013.01); *C21D 1/25* (2013.01); *C21D 1/60* (2013.01); *C21D 1/785* (2013.01); *C21D 1/42* (2013.01); *C21D 1/58* (2013.01); *C21D 2221/00* (2013.01)

(58) Field of Classification Search
CPC ... C21D 1/10; C21D 1/18; C21D 1/25; C21D 1/42; C21D 1/58; C21D 1/60; C21D 1/785; C21D 2221/00; C21D 9/0093
See application file for complete search history.

(56) References Cited

U.S. PATENT DOCUMENTS

| | | | |
|---|---|---|---|
| 2,229,565 A * | 1/1941 | Hallowell, Jr. | ...... C21D 9/0093 411/403 |
| 6,109,851 A | 8/2000 | Bauer et al. | |
| 6,338,600 B2 | 1/2002 | Friederich et al. | |
| 7,247,099 B2 | 7/2007 | Friederich et al. | |
| 8,172,692 B2 | 5/2012 | Price et al. | |
| 8,876,451 B2 | 11/2014 | Kimura et al. | |
| 9,340,848 B2 | 5/2016 | Pinzl et al. | |
| 2007/0243043 A1* | 10/2007 | Price | ...... F16B 33/06 411/386 |
| 2008/0163728 A1 | 7/2008 | Dillon | |
| 2010/0083795 A1 | 4/2010 | Eggert | |
| 2013/0206513 A1 | 8/2013 | Webb et al. | |
| 2015/0010376 A1 | 1/2015 | Zach | |

* cited by examiner

*Primary Examiner* — Jenny R Wu

(74) *Attorney, Agent, or Firm* — Brannon Sowers & Cracraft

(57) ABSTRACT

A method of heat treating a fastening member having a head portion, a shank portion, and a thread portion includes hardening the fastening member to a first hardness value. Hardening of the fastening member includes heating the fastening member at a first pre-set temperature value. The method also includes tempering the fastening member at a second pre-set temperature value to a second hardness value. The method further includes induction tempering the thread portion of the fastening member. Induction tempering of the thread portion includes heating the thread portion at a third pre-set temperature value to a third hardness value. The third hardness value of the thread portion is less than the second hardness value of the head portion and the shank portion.

13 Claims, 3 Drawing Sheets

METHOD OF HEAT TREATING A FASTENING MEMBER

TECHNICAL FIELD

The present disclosure relates to a fastening member, and more particularly to a method of heat treating the fastening member to obtain high shear strength.

BACKGROUND

Fastening members, such as bolts, are integral parts of machines that are used to couple two or more components of the machines with each other. Typically, the fastening members include a head portion, a shank portion, and a thread portion. Strength of such fastening members are limited by the thread portion, since geometry of the thread portion acts as a stress riser. More particularly, localized stresses at roots of the thread portion limit the strength of the thread portion substantially. Currently, the fastening members are bulk heat treated by hardening followed by tempering to obtain a desired hardness value. Typically, the hardness of the fastening members is limited to 45 Rockwell C. Higher hardness value may make the thread portion of the fastening members susceptible to delayed fracture. However, the bulk heat treatment of the fastening member limits the shear strength of the shank portion of the fastening member to approximately 1075 Mega Pascal (MPa), which is not desirable.

U.S. Patent Publication Number 2008/163728 describes a dual hardness connector including a body having a first portion and a second portion integrally formed with the first portion. The first portion has a first hardness and the second portion has a second different hardness. In an embodiment, the first portion has a first hardness of at least 40 Rockwell C and the second portion has a second hardness that is less than the first hardness. In another embodiment, the second portion has a hardness of 30 Rockwell C or less and the first portion has a greater hardness than the hardness of the second portion. The connector is made using a method including the steps of forming a body having first and second portions, and induction hardening the first portion to a hardness of at least 40 Rockwell C or the second portion to a hardness of 30 Rockwell C or less.

SUMMARY OF THE DISCLOSURE

In one aspect of the present disclosure, a method of heat treating a fastening member is provided. The fastening member includes a head portion, a shank portion, and a thread portion. The method includes hardening the fastening member to a first hardness value. Hardening of the fastening member includes heating the fastening member at a first pre-set temperature value. The method also includes tempering the fastening member at a second pre-set temperature value to a second hardness value. The method further includes induction tempering the thread portion of the fastening member. Induction tempering of the thread portion includes heating the thread portion at a third pre-set temperature value to a third hardness value. The third hardness value of the thread portion is less than the second hardness value of the head portion and the shank portion.

In another aspect of the present disclosure, a fastening member is provided. The fastening member comprises a head portion and a body portion attached to the head portion. The body portion includes a shank portion extending from the head portion. The head portion and the shank portion are tempered to a hardness value between 48 Rockwell C and 60 Rockwell C. The body portion also includes a thread portion having a plurality of threads. The thread portion is induction tempered to a hardness value between 25 Rockwell C and 44 Rockwell C.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
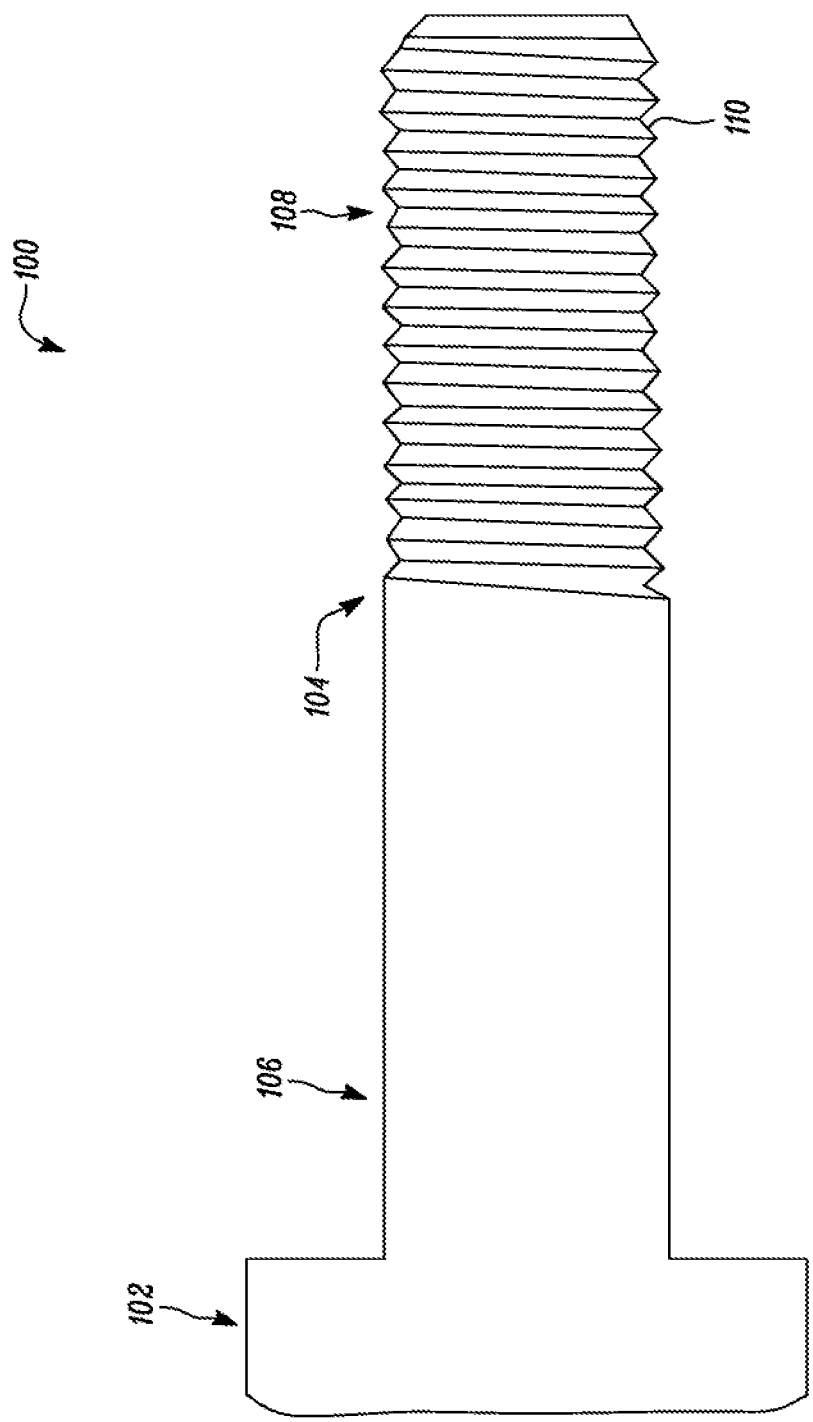
FIG. 1 is a side view of an exemplary fastening member, according to one embodiment of the present disclosure.

FIG. 1 is a side view of an exemplary fastening member 100. In the illustrated embodiment, the fastening member 100 is a bolt. Alternatively, the fastening member 100 may embody any other mechanical fastener known in the art, such as a screw, without any limitations. The fastening member 100 may be made of steel, without any limitations. In one example, the fastening member 100 is embodied as a track bolt associated with an undercarriage system of a machine (not shown).

The fastening member 100 includes a head portion 102. In one example, the head portion 102 includes a hexagonal head portion, without any limitations. Further, the fastening member 100 includes a body portion 104. The body portion 104 is attached to the head portion 102, such that a height of the body portion 104 is greater than a height of the head portion 102. A diameter of the body portion 104 is concentric with a diameter of the head portion 102, and the diameter of the body portion 104 is less than the diameter of the head portion 102.

The body portion 104 includes a shank portion 106 extending from the head portion 102. In various embodiments, the shank portion 106 may extend approximately along ¾ or half of a total length of the body portion 104. The body portion 104 further includes a thread portion 108 extending along a length of the shank portion 106. Further, the thread portion 108 includes a number of threads 110 that allows threadable coupling of the fastening member 100 with a component.

The fastening member 100 is heat treated to obtain desired hardness values at each of the head portion 102, the shank portion 106, and the thread portion 108. The fastening member 100 is subjected to hardening or tempering to different hardness values at the head portion 102, the shank portion 106, and the thread portion 108. More particularly, the fastening member 100 is heat treated at a first pre-set temperature value to a first hardness value. It should be noted that the first pre-set temperature value lies between 800° C. and 950° C. In one embodiment, the first pre-set temperature may be an austenization temperature.

Hardening of the fastening member 100 is embodied as a two-step process that involves heating of the fastening member 100 followed by quenching of the fastening member 100. In one example, hardening is embodied as a through hardening process. As mentioned above, hardening of the fastening member 100 includes heating of the fastening member 100. The heating of the fastening member 100 is performed at the first pre-set temperature value. The heating may be performed in a heating equipment (not shown) including, but not limited to, furnaces or ovens. The fastening member 100 is placed in the heating equipment that is maintained at the first pre-set temperature value for a predetermined amount of time. It should be noted that the heating equipment may embody any other known heating equipment, without any limitations.

Further, after the fastening member 100 is heated in the heating equipment, the fastening member 100 is quenched using a fluid medium. For example, the fluid medium may be oil. In another example, the fluid medium may be water. The fluid medium is selected based on a material of the fastening member 100. In one example, when the fastening member 100 is made of steel, the fluid medium is decided based on an amount of carbon present in the fastening member 100. The first hardness value lies between 50 Rockwell C and 60 Rockwell C.

After the fastening member 100 is hardened to the first hardness value, the fastening member 100 is tempered at a second pre-set temperature value to a second hardness value. In the illustrated example, tempering of the fastening member 100 is embodied as a low-temperature tempering process. The second pre-set temperature value lies between 150° C. and 300° C. Further, the second hardness value lies between 48 Rockwell C to 60 Rockwell C. In one example, the second hardness value is approximately equal to 55 Rockwell C. At the second hardness value, the head portion 102 and the shank portion 106 may have an approximate tensile strength of 2070 Mega Pascal (MPa) and a shear strength of approximately 1500 MPa. Tempering of the fastening member 100 may include heating the fastening member 100 at the second pre-set temperature and allowing the fastening member 100 to cool slowly. Tempering of the fastening member 100 may be performed using any tempering equipment known in the art, without any limitations.

Further, the thread portion 108 of the fastening member 100 is induction tempered after tempering the fastening member 100 to the second hardness value. More particularly, the thread portion 108 of the fastening member 100 is softened by induction tempering. In one example, the thread portion 108 is induction tempered to a depth below the number of threads 110. The depth to which the thread portion 108 is induction tempered may vary based on a type of application.

Induction tempering of the thread portion 108 includes heating the thread portion 108 at a third pre-set temperature value to a third hardness value for a predefined time period. In some embodiments, the predefined time period may be less than 20 seconds. The predefined time period may vary based on the hardness of the threads 110 and the depth of induction tempering. Induction tempering of the thread portion 108 is embodied as an intermediate to high-temperature tempering process, and the third pre-set temperature value lies between 400° C. and 600° C. Further, the third hardness value of the thread portion 108 is less than the second hardness value of the head portion 102 and the shank portion 106. The third hardness value to which the thread portion 108 is induction tempered lies between 25 Rockwell C and 44 Rockwell C. In one example, the third hardness value is approximately equal to 40 Rockwell C.

Figure 2:
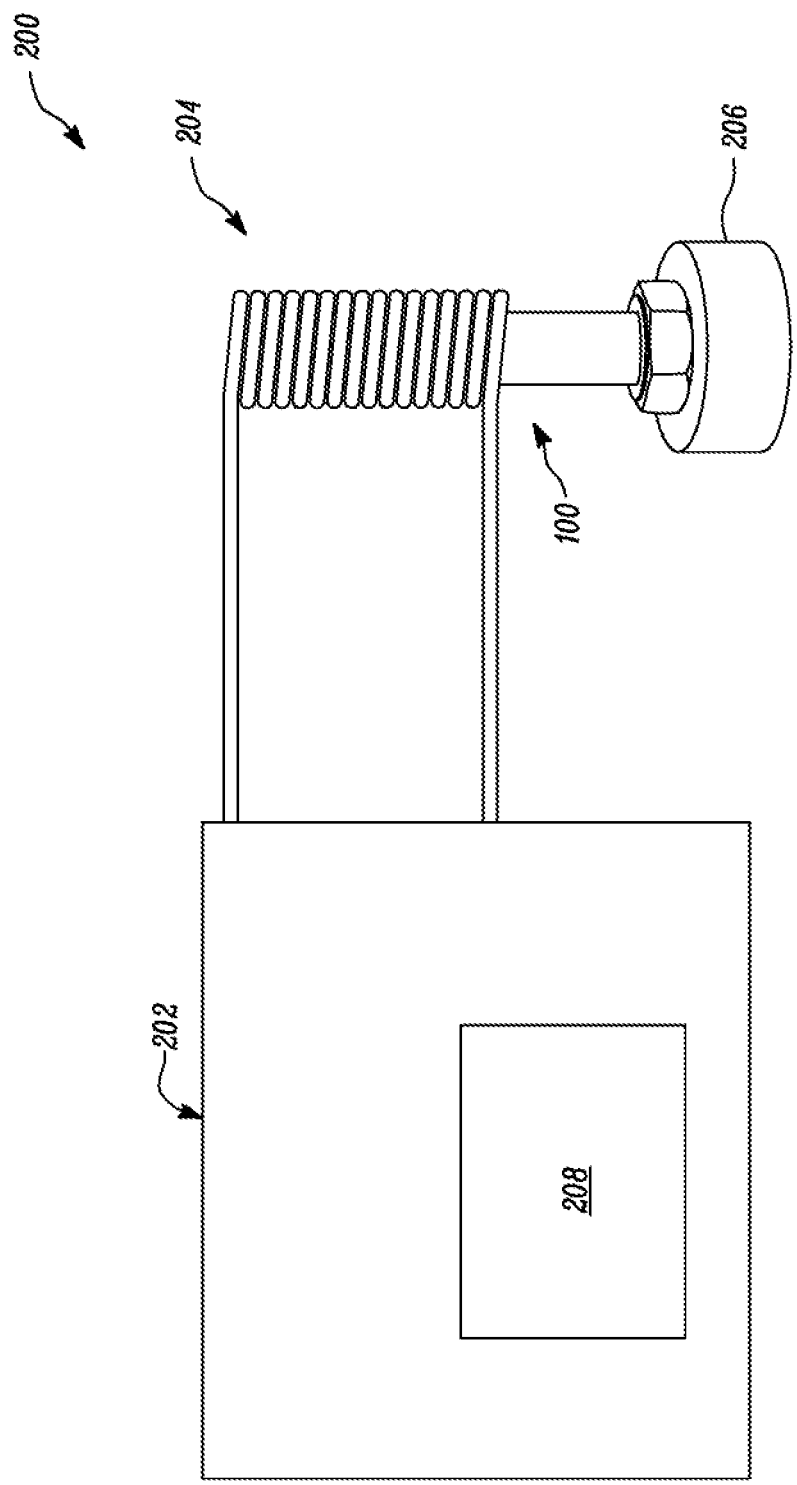
FIG. 2 is an exemplary set-up for induction tempering a thread portion of the fastening member shown in FIG. 1, according to one embodiment of the present disclosure.

Induction tempering of the thread portion 108 will now be explained in detail with reference to FIG. 2. Referring to FIG. 2, an exemplary set-up 200 for performing induction tempering of the thread portion 108 of the fastening member 100 is illustrated. The set-up 200 includes an induction tempering equipment 202. The induction tempering equipment 202 may be embodied as a known in the art equipment that can be used for induction tempering a component, without limiting the scope of the present disclosure.

The set-up 200 includes a holding unit 206 for holding the fastening member 100 during induction tempering of the thread portion 108. Further, the induction tempering equipment 202 may include a high frequency power supply for providing an AC current, without any limitations. The induction tempering equipment 202 also includes an inductor 204. In one example, the inductor 204 may embody a copper coil. The AC current flows through the inductor 204.

The thread portion 108 of the fastening member 100 is disposed within the inductor 204 for heating the thread portion 108 at the third pre-set temperature inductively. It should be noted that the inductor 204 acts as a primary winding and the thread portion 108 acts as a short circuit secondary. When the thread portion 108 is placed within the inductor 204 and enters a magnetic field of the inductor 204, a circulating eddy current is induced within the thread portion 108. The eddy current generates precise and localized heat without any direct contact between the thread portion 108 and the inductor 204.

The induction tempering equipment 202 may also include a control unit 208 for controlling various parameters of induction tempering including, but not limited to, heating time, heating power, heating preservation time, heating preservation power, and cooling time. The control unit 208 may embody a processor or a controller, without limiting scope of the present disclosure. In one example, the control unit 208 of the induction tempering equipment 202 may control the parameters automatically. In another embodiment, the parameters may be controlled by an operating personnel, based on the requirement. It should be noted that details of the set-ups for heat treating the fastening member 100 provided above are exemplary in nature, and any other set-up may be used for heat treating the fastening member 100, without limiting the scope of the present disclosure.

INDUSTRIAL APPLICABILITY

The present disclosure relates to a method 300 of heat treating the fastening member 100 and the heat treated fastening member 100. In an application where the fastening member 100 is subjected to high shear loads, the fastening member 100 requires an increased hardness value and high shear strength. In order to achieve the increased hardness value and the shear strength, the fastening member 100 is heat treated. The present disclosure provides an effective method 300 of increasing the shear strength of the shank portion 106 of the fastening member 100.

Hardening and tempering of the fastening member 100 provides better wear resistance, more particularly, to the head portion 102 and the shank portion 106 of the fastening member 100. As the hardness and strength of the head portion 102 increase, possibility of wear and breakage of the head portion 102 in operation is reduced. Also, the heat treating technique implemented in the present disclosure is easier, cost-effective, and non-polluting. Further, the thread portion 108 of the fastening member 100 is softened via induction tempering, such that an overall strength of the fastening member 100 is increased.

Figure 3:
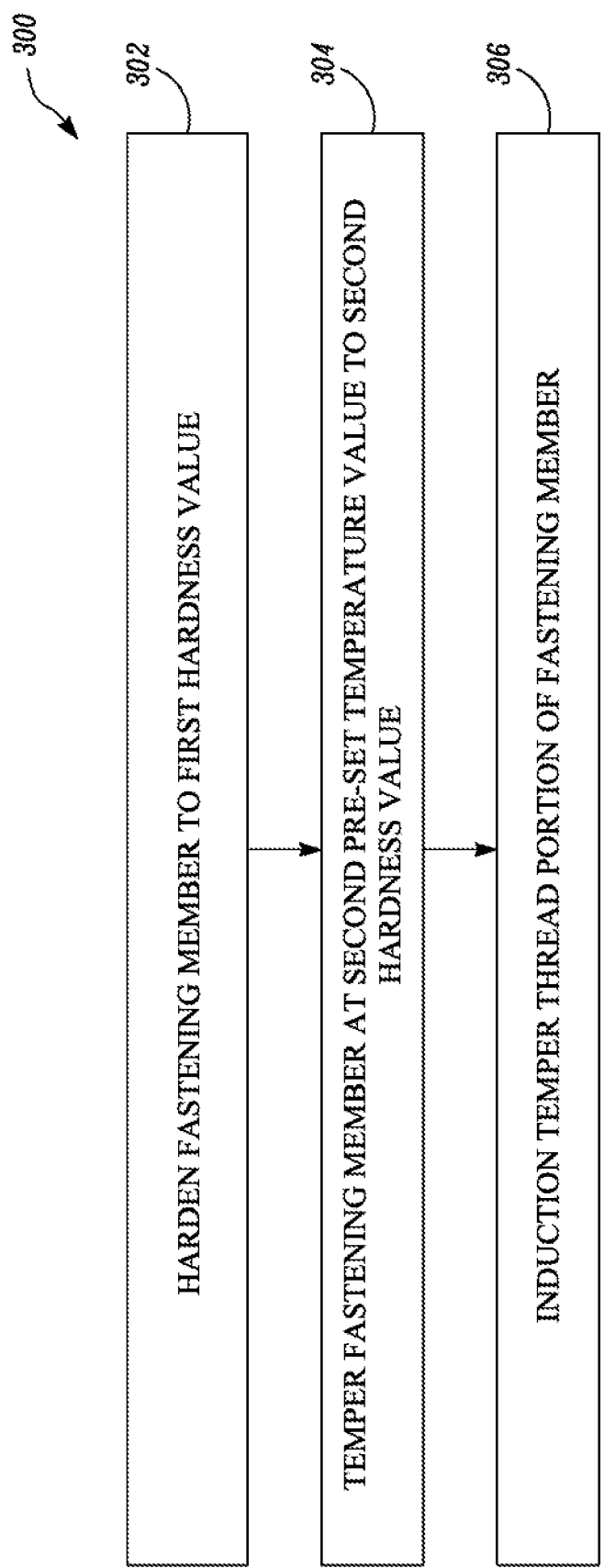
FIG. 3 is a flowchart of a method of heat treating the fastening member, according to one embodiment of the present disclosure.

FIG. 3 is a flowchart illustrating the method 300 of heat treating the fastening member 100. In one example, the fastening member 100 is embodied as a bolt. At step 302, the fastening member 100 is hardened to the first hardness value. The first hardness value lies between 50 Rockwell C and 60 Rockwell C. In one embodiment, hardening of the fastening member 100 is through hardening. Hardening of the fastening member 100 includes heating the fastening member 100 at the first pre-set temperature value. The first pre-set temperature value lies in an austenization temperature range. In one example, the first pre-set temperature value lies between 800° C. and 950° C. Further, upon heating the fastening member 100 at the first pre-set temperature value, the fastening member 100 is quenched using a fluid medium. The fluid medium is selected based on the material, more specifically, the carbon content of the fastening member 100.

At step 304, the fastening member 100 is tempered at the second pre-set temperature value to the second hardness value. The second pre-set temperature value lies between 150° C. and 300° C. Further, the second hardness value lies between 48 Rockwell C and 60 Rockwell C. In one example, the second hardness value is approximately equal to 55 Rockwell C.

At step 306, the thread portion 108 of the fastening member 100 is induction tempered. The thread portion 108 is induction tempered to the depth below the number of threads 110. Induction tempering of the thread portion 108 includes heating the thread portion 108 at the third pre-set temperature value to the third hardness value. The third hardness value of the thread portion 108 is less than the second hardness value of the head portion 102 and the shank portion 106. The third pre-set temperature value lies between 400° C. and 600° C. Further, the third hardness value of the thread portion 108 lies between 25 Rockwell C and 44 Rockwell C. In one example, the hardness value of the thread portion 108 is approximately equal to 40 Rockwell C.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fastening member comprising:
a head portion having an outside head surface and an inside head surface; and
a body portion attached to the head portion, wherein the body portion includes:
a shank portion extending from the head portion, wherein the head portion and the shank portion are tempered to a hardness value between 48 Rockwell C and 60 Rockwell C; and
a thread portion having a plurality of threads, wherein the thread portion is induction tempered to a hardness value between 25 Rockwell C and 44 Rockwell C;
the shank portion originating at the inside head surface and terminating at the thread portion, and being unthreaded along a full shank portion length extending from the inside head surface to the thread portion; and
the thread portion originating at the shank portion and terminating at a fastening member terminal tip, and the plurality of threads are hardened to the hardness value between 25 Rockwell C and 44 Rockwell C along a full thread portion length extending from the shank portion to the fastening member terminal tip.

2. The fastening member of claim 1, wherein the hardness value of the head portion and the shank portion is about 55 Rockwell C.

3. The fastening member of claim 1, wherein the thread portion is induction tempered to a depth below the plurality of threads.

4. The fastening member of claim 1, wherein the fastening member is hardened at a first pre-set temperature value prior to tempering, hardening of the fastening member including heating the fastening member.

5. The fastening member of claim 4, wherein the first pre-set temperature value lies between 800° C. and 950° C.

6. The fastening member of claim 4, wherein the fastening member is quenched using a fluid medium upon heating the fastening member at the first pre-set temperature value, wherein the fluid medium is selected based on a material of the fastening member.

7. The fastening member of claim 6, wherein the fastening member is tempered at a second pre-set temperature value upon the quenching of the fastening member.

8. The fastening member of claim 7, wherein the second pre-set temperature value lies between 150° C. and 300° C.

9. The fastening member of claim 1, wherein the thread portion is induction tempered after tempering of the head portion and the shank portion.

10. The fastening member of claim 9, wherein induction tempering of the thread portion includes heating the thread portion at a third pre-set temperature value for a pre-defined time period.

11. The fastening member of claim 10, wherein the third pre-set temperature value lies between 400° C. and 600° C.

12. The fastening member et claim 1 wherein the full shank portion length is between ½ and ¾ of a length of the body portion.

13. The fastening member of claim 12 wherein the hardness value of the head portion and the shank portion is about 55 Rockwell C, and the hardness value of the thread portion is about 40 Rockwell C.

* * * * *